United States Patent [19]

Kessler

[11] Patent Number: 4,515,126

[45] Date of Patent: May 7, 1985

[54] DEVICE FOR DAMPING PERIODICALLY ALTERNATING LONGITUDINAL ACCELERATIONS OF A MOTOR VEHICLE

[75] Inventor: Jochen Kessler, Karlsruhe, Fed. Rep. of Germany

[73] Assignee: Dr. Ing. h.c.F. Porsche AG, Fed. Rep. of Germany

[21] Appl. No.: 546,555

[22] Filed: Oct. 28, 1983

[30] Foreign Application Priority Data

Oct. 30, 1982 [DE] Fed. Rep. of Germany ....... 3240293

[51] Int. Cl.³ ............................................. F02D 9/08
[52] U.S. Cl. .................... 123/401; 123/399; 123/492
[58] Field of Search ................ 123/395, 396, 399–403, 123/492

[56] References Cited

U.S. PATENT DOCUMENTS

| 4,250,845 | 2/1981 | Collonia | 123/361 |
| 4,354,467 | 10/1982 | Noddings et al. | 123/361 |
| 4,355,611 | 10/1982 | Hasegawa | 123/401 |
| 4,453,516 | 6/1984 | Filsinger | 123/399 |

Primary Examiner—William A. Cuchlinski, Jr.
Attorney, Agent, or Firm—Craig & Burns

[57] ABSTRACT

An installation for damping periodically alternating longitudinal accelerations of a motor vehicle, which are also designated as jerking movements and which occur, above all, in motor vehicles whose internal combustion engines are equipped with electronic fuel injection systems and have a high torque already in the lower rotational speed so that they react very rapidly and sensitively to movements of the gas pedal; the jerking oscillations are thereby damped by the installation of electric and/or hydraulic damping devices into the control system for the fuel-, respectively, mixture-admixing installation.

8 Claims, 5 Drawing Figures

DEVICE FOR DAMPING PERIODICALLY ALTERNATING LONGITUDINAL ACCELERATIONS OF A MOTOR VEHICLE

The present invention relates to a device for damping periodically changing longitudinal accelerations or jerking oscillations of a motor vehicle which is driven by an internal combustion engine with a throttle valve in the air suction pipe and with an electronically controlled fuel injection system.

Such changes in the vehicle acceleration which become noticeable to the passengers as annoying jerks, occur above all in motor vehicles whose internal combustion engines react very rapidly and sensitively to the movements of the gas pedal. They occur frequently during a constant drive with motor vehicles whose internal combustion engines have a high torque already in the lower rotational speed range so that also small movements of the gel pedal, respectively, of the throttle valve strongly influence the vehicle acceleration. The once initiated jerking may remain preserved over long periods of time and renders the driving both uncomfortable and dangerous. The driver of the motor vehicle thereby acts as a type of feedback in that he actuates unintentionally the gas pedal in a rhythmic manner by means of the foot.

The task of the present invention consists in damping such jerking movements, respectively, to assure by intentional measures that they cannot occur.

The underlying problems are solved according to the present invention in that the jerking movements are damped by the installation of an electrical or mechanical-hydraulic damper into the control system of the fuel-, respectively, mixture-admixing mechanism. An electric filter built into the electric line from an air quantity measuring device to an electronic control apparatus is tuned to the most frequently occurring jerking frequency of 2-2 Hertz and therewith blocks the transmission thereof. It may also form a structural unit together with the control apparatus.

In lieu of or in addition to this electric damping, also a mechanical-hydraulic damping of the throttle valve or of the gas pedal may be used, whereby a reciprocating piston damper or a rotary valve damper is used. A rhythmic movement of the gas pedal mechanically connected with the throttle valve in the rhythm of the jerking oscillations is rendered difficult thereby. In order to prevent that the damper delays too strongly the closing movement of the throttle valve, the damper has a considerably higher damping in the opening direction of the throttle valve than in the closing direction thereof.

These and further objects, features and advantages of the present invention will become more apparent from the following description when taken in connection with the accompanying drawing which shows, for purposes of illustration only, several embodiments in accordance with the present invention, and wherein.

Figure 1:
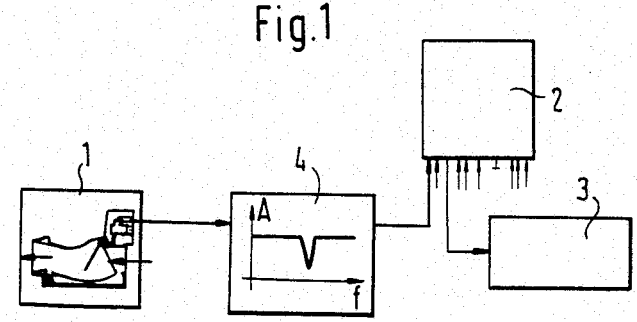
FIG. 1 is a schematic block diagram of an electric damping system by means of a filter in accordance with the present invention.
Figure 2:
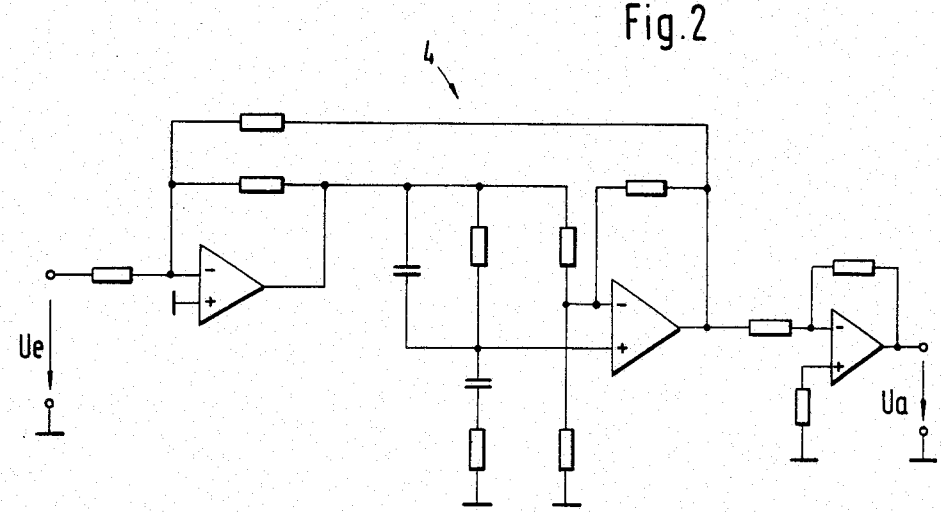
FIG. 2 is a circuit diagram of the filter used in the electric damping system of FIG. 1.

Referring now to the drawing wherein like reference numerals are used throughout the various views to designate like parts, and more particularly to FIG. 1, a filter 4 is connected into the electric connecting line from an air quantity measuring device 1 to a control apparatus 2 for the control of an injection-period transmitter 3 of an electronic fuel injection installation; the filter 4 is commercially available under the designation of "Wien-Robinson-Suppression Filter." The circuit of the filter 4 illustrated in FIG. 2 is taken from the book, Semiconductor Circuit Techniques (Halbleiter Schaltungstechnik), page 315, Springer-publication, and has been completed by an added-on inverter. The filter is described so extensively in this publication that a further description thereof is dispensed with herein. The filter has an attenuation of about 40 dB and a Q-factor of 1; it is therefore relatively wide-band and is tuned to a frequency of about 2.6 Hz. As can be seen from the block diagram of FIG. 1, at this frequency f, the amplitude A of the voltage signal supplied by the air quantity measuring device is attenuated to such an extent that the jerking oscillations of the motor vehicle are no longer noticeable.

Figure 3:
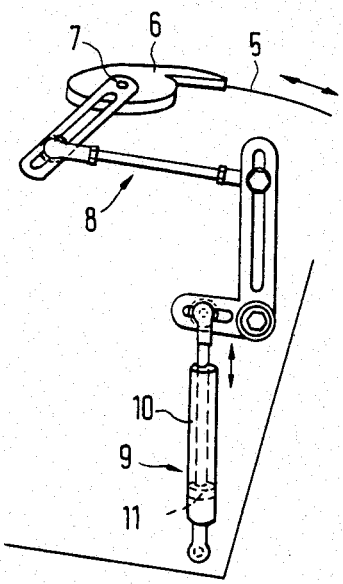
FIG. 3 is a perspective view of a reciprocating piston damper at the throttle valve in accordance with the present invention.

A mechanical-hydraulic damping mechanism attached to the throttle valve is illustrated in FIG. 3. A throttle valve shaft 7 is rotatable by means of a Bowden cable 5 by way of a cam disk 6. A hydraulic reciprocating piston damper generally designated by reference numeral 9 acts on the throttle valve shaft 7 by way of a joined linkage mechanism generally designated by reference numeral 8. The reciprocating piston damper 9 consists of an oil-filled cylinder 10 and of a piston 11 longitudinally guided therein. In addition to the hydraulic damping in the reciprocating piston damper 9, the mechanical friction of the linkage mechanism 8 thereby also contributes to the damping of periodic oscillations of the throttle valve.

Figure 4:
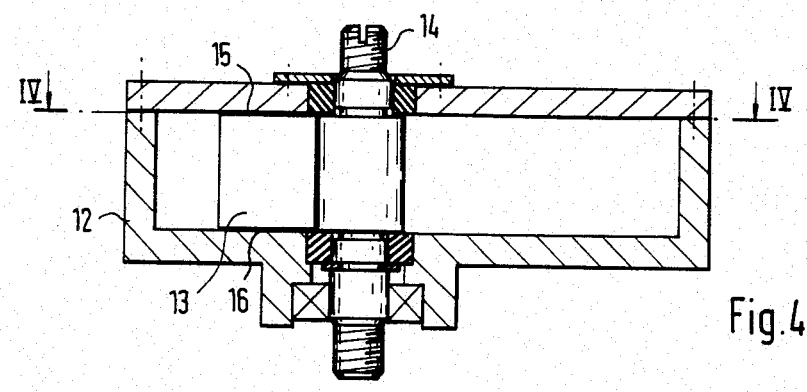
FIG. 4 is an axial cross-sectional view through a rotary valve damper in accordance with the present invention.
Figure 5:
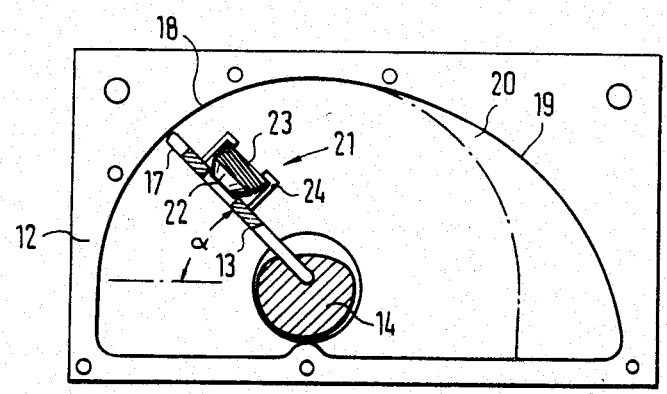
FIG. 5 is a cross-sectional view taken along line IV—IV of FIG. 4.

A constructively more simple embodiment of a hydraulic damper is illustrated in FIGS. 4 and 5. A rotary valve 13 is arranged in a damper housing 12 which is filled with a liquid; the shaft 14 of the rotary valve 13 is rotatably supported in the damper housing 12, extends toward the outside in a fluid-tight manner and is connected with the throttle valve shaft. The rotary valve 13 is fitted with a close tolerance between the walls of the damper housing 12 on both sides 15 and 16 thereof. The free end 17 of the rotary valve 13, at small angles of rotation $\alpha$ slides along the inner contour 18 of the damper housing 12 which is of circular shape within this area, and forms a continuously increasing gap 20 with respect to the inner contour 19 which becomes wider ellipitically shaped with increasing angles of rotation $\alpha$. Since a small opening angle of the throttle valve corresponds to a small angle of rotation $\alpha$, this construction of the housing contour has as a consequence that the rotary valve 13 experiences a high flow resistance during a small opening angle of the throttle valve which is increasingly reduced with an increasing angle of rotation $\alpha$. Oscillatory movements of the throttle valve and jerking movements of the vehicle caused thereby are damped more effectively at small opening angles of the throttle valve and at small rotational speeds of the internal combustion engine whereby they preferably occur, that an large opening angles of the throttle valve.

A check valve 21 is provided on the rotary valve 13, which consists of a valve cone 22 and of a compression spring 23 which is supported at a sleeve 24 screwed on the rotary valve. During an opening movement of the throttle valve, the valve cone is pressed sealingly against its valve seat. In contrast thereto, during a movement in the opposite direction, i.e., during the closing of the throttle valve, the fluid resistance lifts the valve cone off its seat so that a through-flow opening is released for the liquid, the flow resistance of the rotary valve thus becomes smaller, and the throttle valve is damped to a lesser extent. This damping, reduced in the closing direction, was intentionally provided in order to permit the time of return of the throttle valve, when taking the foot off the gas pedal, respectively, when reducing the depressing of the gas pedal, to become only slightly longer than with throttle valves without damping.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for damping periodically alternating longitudinal accelerations, respectively, jerking movements of a motor vehicle which is driven by an internal combustion engine having control means for controlling the admixture of fuel, respectively, fuel-air mixture including electronic fuel injection means and a mechanically actuated throttle valve means in its air suction channel, wherein the jerking motions are damped by a damper means operatively connected into the control means, and an electric filter means is interconnected as damper means into an electric connecting line from an air quantity measuring means to an electronic control apparatus, and the filter means is operable to be short-circuited by a switch means actuated by the throttle valve mean by way of a relay means.

2. An installation for damping periodically alternating longitudinal accelerations, respectively, jerking movements of a motor vehicle which is driven by an internal combustion engine having control means for controlling the admixture of fuel, respectively, fuel-air mixture including a fuel injection means and a mechanically actuated throttle valve means in its air suction channel, wherein the jerking motions are damped by a damper means operatively connected into the control means, and the rotary movement of the throttle valve shaft is damped by a rotary valve means connected therewith which is arranged within a liquid-filled damper housing.

3. An installation according to claim 2, characterized in that the damping decreases with increasing opening of the rotary valve by a corresponding configuration of the damper housing in coordination with the rotary valve means.

4. An installation according to claim 3, characterized in that the rotary valve means is so constructed that a higher flow resistance opposes its movement in the opening direction of the throttle valve means than its movement in the closing direction.

5. An installation according to claim 4, characterized in that a check valve means is built into the rotary valve means which opens during closing movement of the throttle valve means and therewith opens up a liquid through-flow opening through the throttle valve means.

6. An installation according to claim 2, characterized in that the rotary valve means is so constructed that a higher flow resistance opposes its movement in the opening direction of the throttle valve means than its movement in the closing direction.

7. An installation according to claim 6, characterized in that a check valve means is built into the rotary valve means which opens during closing movement of the throttle valve means and therewith opens up a liquid through-flow opening through the throttle valve means.

8. An installation for damping periodically alternating longitudinal accelerations, respectively, jerking movements of a motor vehicle which is driven by an internal combustion engine having control means for controlling the admixture of fuel, respectively, fuel-air mixture including a fuel injection means and a mechanically actuated throttle valve means in its air suction channel, wherein the jerking motions are damped by a damper means operatively connected into the control means, and an electric filter means is interconnected as damper means into an electronic fuel injection means and is operable to be short-circuited by a switch means actuated by the throttle valve means by way of a relay means.

* * * * *